Jan. 9, 1962 P. MALLERY 3,016,196
ARITHMETIC CARRY GENERATOR
Filed Nov. 6, 1958
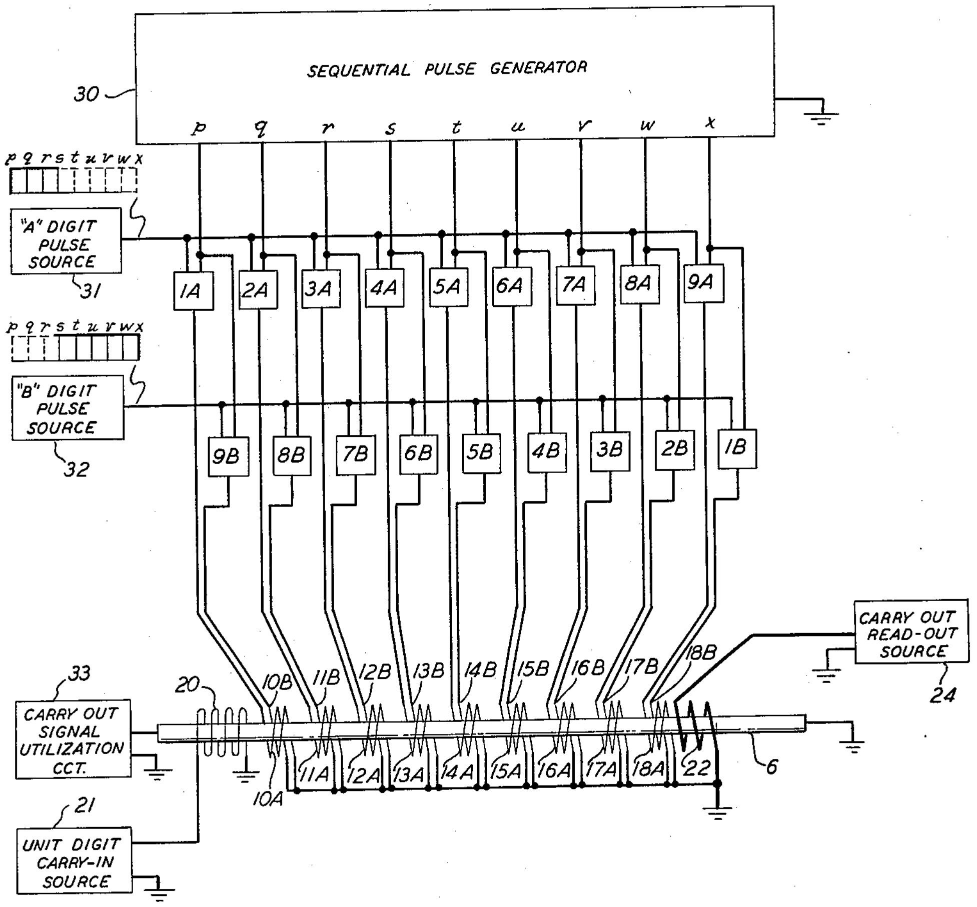
INVENTOR
P. MALLERY
BY Kenneth B Hamlin
ATTORNEY 3,016,196
Patented Jan. 9, 1962

3,016,196

ARITHMETIC CARRY GENERATOR

Paul Mallery, Murray Hill, N.J., assignor to Bell Telephone Laboratories, Incorporated, New York, N.Y., a corporation of New York Filed Nov. 6, 1958, Ser. No. 772,208
13 Claims. (Cl. 235—176)

This invention relates to devices for performing arithmetic operations and more particularly to apparatus for generating the carry-out function in arithmetic addition.

In the process of arithmetic addition, the digits of corresponding order in each of two numbers, called respectively, the augend and the addend, are combined to yield for each digit order, a pair of values known respectively, as the sum and the carry. The carry obtains whenever the sum equals or exceeds the base of the number system used. To illustrate, the decimal values 6 and 7 are combined in addition to yield a sum 13 which sum, for the purposes of utilization in digital computing equipment, is more appropriately represented by two separate values, namely, a sum 3 and a carry "1," it being understood that the carry "1" is actually an indication of the decimal quantity "10." In automatic digital computation it is appropriate to represent each of the decimal digits with a distinctive arrangement of binary symbols or bits. The particular method of representation employed is determined in large measure by the character of the application in which the arithmetic addition process is to be utilized. Thus, for example, in computing circuits intended for applications which are characterized by a large number of input-output operations involving data expressed in decimal quantities, it is indicated that the intervening arithmetic processes be performed in decimal notation rather than in another notational form in which extensive translation would be required. Decimal values are represented by various coding arrangements. See, for example, R. K. Richards' "Arithmetic Operations in Digital Computers," D. Van Nostrand Company, page 230. In one of these arrangements the number or duration of signal pulses is proportioned according to the particular decimal value to be represented. In the arithmetic addition of decimal quantities thus expressed, it is important that the occurrence of pulses representative of decimal sums totaling 10 or more be readily detected and that a carry signal indicative of this occurrence be rendered available to the next higher order adder wherein the carry may be combined with two further pulses representative of further decimal input quantities, and so on, without the need for extensive intermediate translation.

Accordingly, it is an object of the present invention to facilitate the addition of decimal quantities.

It is another object of this invention to provide an efficient method for developing the carry function in arithmetic addition.

It is still another object of this invention to provide an efficient apparatus for combining numerical quantities represented by signals of a variable number of pulses or variable length.

The present invention advantageously makes use of the open flux path magnetic conductor described by A. H. Bobeck in the copending application, Serial No. 675,522, filed August 1, 1957, and discussed in the November 1957 issue of the Bell System Technical Journal together with the principles of switched region propagation disclosed in the copending application of A. H. Bobeck, Serial No. 752,905, filed August 4, 1958.

In the above-referenced article a preferred helical flux path is established in a magnetic conductor into which information may be inserted in the form of a polarized helical magnetization. The information is sensed using the magnetic conductor as a sensing means by detecting the polarity of the voltage produced across the ends of the magnetic conductor as its magnetization state is changed.

In the above second-mentioned, copending application of A. H. Bobeck, the interaction effects which exist between magnetized regions on a magnetic wire, such as a wire exhibiting a preferred helical flux path, are utilized to "slide" a magnetized region along the magnetic wire under the control of externally applied magnetizing forces established by a plurality of phase windings. The principles upon which the operation of this device is believed to be formulated is that there is asociated with a stable magnetic spot a minimal critical length below which the spot is unstable. Stated another way, the magnetic material exhibits a substantially square loop or two-state hysteresis characteristic when excited over at least a minimal conductor dimension. A stable magnetized region, i.e., one within which a stable hysteretic state has been established is therein operated upon by phase windings, each of which is less than the critical length, such that the forward energization of a phase winding at the head end of a magnetic spot and the reverse energization at the tail end of a magnetic spot will cause the magnetic spot to appear to move in a definite direction along the magnetic wire.

In accordance with the principles of this invention, an arithmetic carry-out function is generated by applying decimal addend and augend signals and a unit carry-in signal to a magnetic conductor exhibiting two-state hysteresis characteristics beyond a minimal dimension, to establish therein a stable magnetic spot and to extend the magnetic spot to a read-out position only under the circumstances when the sum of the addend, augend and carry-in signal equals or exceeds the value 10. In one specific illustrative embodiment of this invention for developing a carry-out function in response to the arithmetic sum of decimal values represented by variable length pulses, a winding is provided for coupling the unit carry-in signal to a magnetic conductor to establish therein a stable magnetic spot remote from the read-out position on the magnetic conductor. The addend and the augend signal each energizes a number of consecutive subminimal-length windings in accordance with its respective pulse duration, the windings being arranged in pairs and the addend signal energizing one winding and the augend signal energizing the other winding of the pairs. A stable magnetic spot set by a unit carry-in signal will be extended to the readout position by addend and augend signals whose durations (decimal values) are sufficient to energize a continuous sequence of subminimal-length windings while a stable magnetic spot may be set and sequentially extended to the readout position, whether or not a carry-in is present, by the simultaneous energization of the two subminimal-length windings of any winding pair.

It is a feature of the present invention that particular sums of input information signals define a unique magnetic state throughout a sequence of contiguous elemental portions of a magnetic conductor.

It is another feature of the present invention that sums of input information signals which exceed a predetermined value establish a distinctive magnetic state in a predetermined portion of a magnetic conductor.

It is another feature of the present invention that a pair of variable-length digital pulses develop a carry-out signal by activating a magnetic conductor length proportional to the duration and sequence of the pulses.

It is another feature of the present invention that a unitary input information signal, establishing a stable magnetic spot in a portion of a magnetic conductor, be selectively combined with particular sums of input information signals to extend the magnetic spot throughout the conductor.

A complete understanding of this invention and of these and various other features thereof may be gained from the following detailed description and the accompanying drawing, the single figure of which shows a decimal carry-out generator. In the drawing there is shown an elongated magnetic conductor 6 which advantageously may be of the type described in the above-mentioned copending application, Serial No. 675,522. Coupled to magnetic conductor 6 are nine pairs of extending windings 10A–10B through 18A–18B, each A and each B winding thereof being of the above-mentioned subminimal-length. To the left of the first pair of extending windings 10A–10B is carry-in winding 20 which is of at least minimal length and which when energized by unit digit carry-in source 21 establishes a distinctive, stable spot of magnetization in conductor 6. Advantageously, source 21 may comprise a simple battery supply which is turned on to represent the presence of a unit carry-in digit. The spacing between subminimal-length windings 10A–10B and carry-in winding 20 is such that the stable spot when established under winding 20 may be extended by the subsequent energization of either subminimal-length winding 10A or 10B. Winding pairs 11A–11B through 18A–18B are positioned along conductor 6 so that either an energized subminimal-length A or B winding of a winding pair will extend into the portion of conductor 6 to which it is coupled, a stable magnetic spot located under a next preceding A and B winding pair but which will not so extend a more remotely-located magnetic spot. The A and B windings of each pair are advantageously superimposed so that the length of the pair is substantially the same as that of the single A or B winding of the pair. For purposes of clarity in identifying the individual A and B windings, these windings have been shown as being overlapped in the drawing, in consequence of which the length of the winding pair appears to be slightly in excess of the subminimal-length of either A or B winding above. Advantageously, however, the winding pair may be constructed as is schematically indicated so that the length of pair exceeds the subminimal-length of the constituent windings. Alternatively, with equally advantageous results, the gates 1A–9A and 9B–1B, shown in the drawing as being respectively connected to windings 10A–18A and 10B–18B, may be both connected to windings 10A–18A when the gates 1A–9A and 9B–1B are capable of supplying constant current signals. In this latter case windings 10B–18B would be omitted. When both the A and the B winding of any of the winding pairs 10A–10B through 18A–18B are simultaneously energized a magnetizing force is applied over a greater than subminimal-length of conductor 6 and a stable magnetic spot will be established in conductor 6 under the simultaneously energized winding pair. When, on the other hand, only one winding of any winding pair is energized, and no distinctive spot of magnetization exists under a next preceding winding, a distinctive magnetic spot can neither be established nor extended under the energized subminimal-length winding. Located to the right of winding pair 18A–18B is read-out winding 22 which is of at least minimal length and which is wound in opposite sense to that of winding pair 18A–18B. Nine AND gates 1A through 9A are connected between the nine windings 10A to 18A and the nine terminals *p* through *x* of sequential pulse generator 30. The nine AND gates 1A through 9A are each connected to, and controlled by "A" digit pulse source 31. Nine AND gates 9B through 1B are respectively connected between the nine terminals *p* through *x* and windings 10B through 18B, and gates 9B through 1B are each connected to and controlled by "B" digit pulse source 32.

In operation, the generation of an arithmetic carry, when the sum of two decimal quantities equals or exceeds the value 10, proceeds as follows: Consider the carry-in digit to be zero, i.e., source 21 and winding 20 de-energized. The augend or "A" digit pulse source 31 supplies pulse signals whose number or time duration is proportional to the value of the augend decimal digit and which pulse signals commence at the start of the digit signaling interval. "A" digit source 31 and sequential pulse generator 30 are synchronized so that the sequential activation of each of the nine terminals *p* through *x* coincides with a corresponding one of the nine different signal durations or nine different numbers of pulses supplied by "A" digit source 31, the digit signaling interval being the time elapsed between activation of terminals *p* and *x*. Thus, the augend decimal quantity 4 would be represented by a pulse supplied by "A" digit source 31 which commences simultaneously with the activation of terminal *p* and terminates after the activation of terminal *s*. Simultaneous presence of the "A" digit pulse from source 31 and signals from the sequentially activated terminals *p* through *s* causes the sequential operation of gates 1A through 4A and results in the sequential energization of subminimal-length windings 10A through 14A. The addend or "B" digit pulse source 32, in a manner similar to the "A" digit source 31, supplies pulse signals whose time duration or number is proportional to the value of the decimal digit, in this case the addend digit. However, the pulses from the "B" digit source do not commence with the activation of terminal *p* except in the case where the digit 9 is to be represented. The duration of the "B" digit pulse is advantageously measured by counting "down" from the activation of the terminal *x* rather than, as in the case of the "A" digit pulse by counting "up" from the activation of terminal *p*. Thus, the addend digit 6 would be represented by the "B" digit source 32 remaining "off" during the activation of terminals *p*, *q* and *r* and by the "B" digit source producing a pulse or being "on" during the activation of terminals *s*, *t*, *u*, *v*, *w*, and *x*. Similarly, the addend digit 2 would be represented by the "B" digit source 32 being "off" during activation of terminals *p*, *q*, *r*, *s*, *t*, *u* and *v* and by being "on" during activation of terminals *w*, and *x*. Constructional details of synchronized pulse sources for representing decimal numbers such as sources 31 and 32 being well known in the telephone dial pulse signaling art, are not herein necessary to be further described.

In the representation of the addend digits, the simultaneous presence of the "B" digit pulse from source 32 and of the signals from sequentially activated terminals *p* through *x* results in both the operation of selected ones of gates 9B through 1B as well as the energization of selected ones of subminimal-length windings 10B through 18B. For example, during the representation of an addend digit of value 2, signals will be simultaneously produced by "B" digit source 32 and terminals *w* and *x* thereby operating gates 2B and 1B and energizing subminimal-length windings 17B and 18B. Since winding 17B is not contiguous to the last energized "A" digit, winding mentioned above in relation to the operation, viz. winding 13A, and since unit digit carry-in source 21 was not energized prior to operation of "A" digit source 31 a stable spot of magnetization is neither established in conductor 6 nor extended therein to reach readout winding 22. Thus, upon energization of readout winding 22 by carry-out readout source 24 at any convenient time following the activation of terminal *x*, no flux will be switched under winding 22 and no carry-out voltage will be detected by utilization circuit 33.

Had unit digit carry-in pulse source 21 energized winding 20 prior to the activation of terminals *p–s* the stable magnetic spot established in conductor 6 under winding 20 would have been sequentially extended in conductor 6 only as far as winding 13A. On the other hand, the operation of "B" digit source 32 to represent an addend digit 6 and the operation of "A" digit source, as before, to represent the augend digit 4 would have resulted in the sequential energization of windings 10A to 13A and 13B to 18B, respectively, with windings 13A and 13B being simultaneously energized. As stated above, simultaneous energization of both subminimal-length windings of any winding pair produces a distinctive stable spot of magnetization in conductor 6 under the winding pair. Since all the contiguous windings, viz. 13B to 18B, between the stable spot of magnetization produced under winding pair 13A–13B and the readout winding 22 are sequentially energized, the magnetic spot will be cumulatively extended to reach winding 22. Upon operation of carry-out readout source 24, the spot of magnetization extended under 22 will be switched and the carry-out voltage thereupon appearing between the grounded right-hand end of conductor 6 and its left-hand end would be detected by carry-out signal utilization circuit 33. Similarly, operation of unit digit carry-in source 21, "A" digit source 31, and the "B" digit source 32 to represent quantities whose sum equals or exceeds the value 10 will result in the establishment of a magnetic spot under readout winding 22 which may be switched to deliver a carry-out signal to utilization circuit 33. On the other hand, operation of sources 21, 31 and 32 yield sums less than the value 10 will not result in the establishment under winding 22 of a magnetic spot which may be switched to deliver a carry-out signal to circuit 33.

It is to be understood that the above-described arrangements are illustrative of the application of the principles of the present invention. Numerous other arrangements may be devised by those skilled in the art without departing from the scope of the invention.

What is claimed is:

1. An arithmetic carry-out generator comprising an elongated magnetic conductor having a plurality of segments and exhibiting remanent magnetization characteristics when excited by at least a minimal magnetizing force, a first source of digit signals, first means connected to said source and coupled to said conductor for applying subminimal magnetizing forces to a predetermined number of said segments proportional to the value of said digital signals, a second source of digital signals, second means connected to said second source and coupled to said conductor for applying subminimal magnetizing forces to a predetermined number of said segments proportional to the value of said digital signals from said second source, and output means coupled to said conductor responsive to the magnetic state produced therein when the subminimal forces of said first means and said second means are applied to the same one of said segments of said conductor.

2. An arithmetic carry-out generator in accordance with claim 1 wherein said subminimal forces of said first means are successively applied to said segments of said conductor starting at one end thereof and extending towards the other end thereof, wherein said subminimal magnetizing forces of said second means are successively applied to said segments of said conductor starting at a point intermediate said one end and said other end thereof and extending to said other end thereof, and wherein said output means is coupled to said other end of said conductor.

3. An arithmetic carry-out generator in accordance with claim 2 further comprising a source of unit digital signals, and means connected to said last-mentioned source and coupled to said conductor at said one end thereof for establishing a stable magnetic state thereat.

4. An arithmetic carry-out generator in accordance with claim 1 further comprising a source of sequential pulses and wherein said first means comprises a first plurality of subminimal length windings coupled to said conductor, and gate means responsive to the digital signals from said first source of digital signals and the sequential pulses from said source of sequential pulses for successively energizing particular one of said first plurality of subminimal length windings, and wherein said second means comprises a second plurality of subminimal length windings coupled to said conductor and gate means responsive to the digital signals from said second source of digital signals and said sequential pulses from said source of sequential pulses for successively energizing particular ones of said second plurality of subminimal length windings.

5. An arithmetic carry-out generator in accordance with claim 4 wherein said first and said second plurality of subminimal length windings are arranged in pairs along said conductor, each of said pairs extending along a length of said conductor greater than said subminimal length.

6. An arithmetic carry-out generator in accordance with claim 1 wherein said conductor has a preferred flux path.

7. An arithmetic carry-out generator in accordance with claim 1 wherein said conductor has a preferred helical flux path.

8. A carry-out function generator comprising an elongated magnetic conductor exhibiting a substantially two-state switching characteristic beyond a minimal dimension, a first and a second plurality of subminimal-length windings coupled to said conductor, said windings being arranged in pairs and being positioned along said conductor to extend therein a magnetic spot from a next preceding one of said pairs, carry-in signal means for establishing a magnetic spot in said conductor adjacent a first of said pairs, first input means for sequentially energizing a predetermined number of said windings of said first plurality, a readout winding coupled to said conductor in juxtaposition with the last of said pairs, second input means for sequentially energizing a predetermined number of said windings of said second plurality the last energized thereof being adjacent said readout winding, means for energizing said readout winding, and means connected to said conductor for detecting the flux switched therein when said readout winding is energized.

9. A carry-out function generator in accordance with claim 8 wherein the longitudinal dimension of each of said pairs of windings is less than said minimal dimension.

10. A carry-out function generator comprising an elongated magnetic conductor exhibiting two-state magnetization characteristics beyond a minimal conductor length, a first source of digital signals, a second source of digital signals, means connected to said first and to said second source for coupling at least one combination of said digital signals to a minimal length of said conductor, a readout means coupled to said conductor, and means connected to said first and to said second source for coupling one of said digital signals of said combination to contiguous subminimal lengths of said conductor between said minimal length and said readout means.

11. A carry-out function generator in accordance with claim 10 wherein said first-mentioned means comprises at least one minimal-length pair of overlapping subminimal-length windings coupled to said conductor, each of said windings being respectively connected to one of said sources.

12. A carry-out function generator in accordance with claim 10 wherein said second-mentioned means comprises a grouping of contiguous subminimal-length windings coupled to said conductor, and means for sequentially coupling said one of said digital signals to said contiguous windings.

13. A carry-out function generator in accordance with claim 10 further comprising a unit digit signal source, means connected to said unit digit source for coupling said unit digit signal to another minimal length of said conductor remote from said first-mentioned contiguous lengths, a further grouping of contiguous subminimal-length windings coupled to said conductor between said another minimal length, and said minimal length, and means for sequentially coupling the other of said digital signals of said one combination to said further grouping.

References Cited in the file of this patent

UNITED STATES PATENTS

| | | |
|---|---|---|
| 2,699,290 | Hoppe | Jan. 11, 1955 |
| 2,733,860 | Rajchman | Feb. 7, 1956 |
| 2,869,786 | Jacobsohn | Jan. 20, 1959 |